US008070369B2

(12) United States Patent
Fernald et al.

(10) Patent No.: US 8,070,369 B2
(45) Date of Patent: Dec. 6, 2011

(54) LARGE DIAMETER OPTICAL WAVEGUIDE SPLICE

(75) Inventors: Mark R. Fernald, Enfield, CT (US); Trevor W. MacDougall, Simsbury, CT (US); Martin A. Putnam, Cheshire, CT (US); Rebecca S. Bryant, Glastonbury, CT (US); Christopher J. Wright, Bend, OR (US); Michael Arcand, Portland, CT (US); Christopher T. Chipman, Scotland, CT (US)

(73) Assignee: Weatherford/LAMB, Inc., Houston, TX (US)

( * ) Notice: Subject to any disclaimer, the term of this patent is extended or adjusted under 35 U.S.C. 154(b) by 2047 days.

(21) Appl. No.: 10/755,708

(22) Filed: Jan. 12, 2004

(65) Prior Publication Data

US 2004/0165841 A1 Aug. 26, 2004

Related U.S. Application Data

(60) Provisional application No. 60/439,106, filed on Jan. 10, 2003, provisional application No. 60/439,243, filed on Jan. 10, 2003.

(51) Int. Cl.
*G02B 6/00* (2006.01)
*G02B 6/255* (2006.01)

(52) U.S. Cl. .......... 385/96; 385/137

(58) Field of Classification Search .......... 385/96, 385/137
See application file for complete search history.

(56) References Cited

U.S. PATENT DOCUMENTS

| | | | | |
|---|---|---|---|---|
| 5,157,751 | A * | 10/1992 | Maas et al. | 385/99 |
| 5,299,274 | A * | 3/1994 | Wysocki et al. | 385/96 |
| 5,649,040 | A * | 7/1997 | Ljungqvist et al. | 385/95 |
| 6,033,515 | A * | 3/2000 | Walters et al. | 385/96 |
| 6,463,872 | B1 * | 10/2002 | Thompson | 65/392 |
| 6,519,388 | B1 | 2/2003 | Fernald et al. | |
| 6,982,996 | B1 | 1/2006 | Putnam et al. | |
| 2001/0014198 | A1 * | 8/2001 | Walters et al. | 385/96 |
| 2002/0197027 | A1 * | 12/2002 | Saito et al. | 385/96 |
| 2003/0108307 | A1 * | 6/2003 | Eskildsen et al. | 385/96 |
| 2003/0223712 | A1 * | 12/2003 | Chapman et al. | 385/96 |
| 2004/0165834 | A1 * | 8/2004 | Bryant et al. | 385/84 |
| 2005/0117856 | A1 * | 6/2005 | Huang et al. | 385/96 |
| 2005/0180703 | A1 * | 8/2005 | Ruegenberg | 385/96 |

OTHER PUBLICATIONS

K. Egashira et al., "Optical Fiber Splicing with a Low-Power $CO_2$ Laser," *Appl. Opt.*, Jun. 1977 vol. 16(6): pp. 1636-1638.
L. Rivoallan et al., "Monomode Fibre Fusion Splicing with $CO_2$ Laser," *Electronics Letters*, Jan. 1983 vol. 19(2): pp. 54-55.

* cited by examiner

*Primary Examiner* — Charlie Peng
*Assistant Examiner* — Mary El Shammaa
(74) *Attorney, Agent, or Firm* — Patterson & Sheridan, LLP

(57) ABSTRACT

Techniques and systems suitable for performing low-loss fusion splicing of optical waveguide sections are provided. According to some embodiments, multiple laser beams (from one or more laser) may be utilized to uniformly heat a splice region including portions of the optical waveguide sections to be spliced, which may have different cross-sectional dimensions. According to some embodiments, the relative distance of the optical waveguide sections and/or the power of the multiple laser beams may be varied during splicing operations.

9 Claims, 4 Drawing Sheets

151 SOURCE
104
306
304
302
152
306
DETECTOR
102

LARGE DIAMETER OPTICAL WAVEGUIDE SPLICE

CROSS-REFERENCE TO RELATED APPLICATIONS

This application claims benefit of U.S. provisional patent application Ser. Nos. 60/439,106 and 60/439,243, both filed Jan. 10, 2003, which are herein incorporated by reference.

BACKGROUND OF THE INVENTION

1. Field of the Invention

Embodiments of the present invention relate to optical waveguide attachment techniques and, more particularly, to techniques for achieving a low loss large diameter fusion splice.

2. Description of the Related Art

Optical industry manufacturers have a variety of products that require attachment or splicing to optical waveguide elements having a larger diameter than typical optical fibers. For example, a thermal gratings, gain flattening filters, pressure and temperature sensors, and potentially many others type devices may be formed in large diameter optical waveguides. In order to connect such devices to optical signal processing equipment, or other such devices connected in series, optical fiber may be attached to the device. To facilitate attachment to such devices, the optical fiber may be encapsulated in a carrier or pigtail having a larger diameter.

Low-loss fusion splicing of optical fiber is a very common operation and many techniques have been developed in order to facilitate this process. For example, one common technique is to use a laser to perform splices, as disclosed in "Optical fiber splicing with a low-power CO2 laser" by Egashira and Kobayashi, Appl. Opt. 16, 1636-1638 (1977), "Monomode fibre fusion splicing with CO2 laser" by Rivoallan et. al., Electronics Letters, vol. 19, No. 2, Jan. 20, 1983, pp 54-55, and U.S. Pat. No. 5,161,207, entitled "Optical fiber circumferentially symmetric fusion splicing and progressive fire polishing."

Such conventional techniques, however, are typically limited to fiber diameters of 400 um or less. Modifying devices utilizing these techniques to accommodate larger diameters optical waveguides (e.g., of a large diameter carrier and device that may be greater than 1 mm) would present a challenge and may not be feasible, particularly when trying to maintain uniform heating around the entire diameter of the splice area to achieve a strong splice, while also maintaining alignment of the narrow (e.g., 5 um diameter) fiber cores to minimize optical loss through the splice region. As a result, encapsulated fiber pigtails are often attached to large diameter devices via epoxy, which not only limits the heat, humidity, and corrosiveness of the environments in which the devices may be placed, but also results in optical loss if the epoxy is placed in the optical path.

Accordingly, what is needed is the capability to perform a large diameter splice (LDS), preferably using laser fusion thus reducing or eliminating many of the disadvantages associated with using epoxy.

SUMMARY OF THE INVENTION

The present invention generally provides methods and systems for performing low loss fusion splicing of large diameter optical waveguide sections.

One embodiment provides a method for splicing two optical waveguide sections. The method generally includes aligning distal ends of the two optical waveguide sections, fusing the distal ends of the optical waveguide sections by exposure to at least two separate laser beams, and moving the distal ends of the optical waveguide sections relative to each other during the fusing.

Another embodiment provides a method for splicing together two optical waveguide sections each having a diameter of at least 400 um. The method generally includes a) aligning distal ends of the two optical waveguide sections, b) providing at least two laser beams for heating the optical waveguide sections, c) adjusting a power level of the at least two laser beams, d) exposing the distal ends of the optical waveguide sections to the at least two laser beams, and e) repeating steps c) and d) until the distal ends are fully fused.

Another embodiment provides a system for fusing first and second optical waveguide sections together generally including at least one source laser to provide at least one laser beam, first and second stages to hold the first and second optical waveguides, respectively, and a beam delivery arrangement. At least one of the first and second stages is movable to provide relative motion between the first and second optical waveguides while holding portions of the first and second optical waveguides to be fused within a fusion splice region. The beam delivery arrangement delivers at least two laser beams to different locations of the fusion splice region, wherein the at least two laser beams are generated from the at least one laser beam provided by the at least one source.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the present invention provide techniques and systems that may be used to perform low-loss fusion splicing of optical waveguide sections, with at least one of the optical waveguide sections having a large diameter. According to some embodiments, laser fusion techniques conventionally limited to small diameter optical waveguides (e.g., conventional optical fibers) may be adapted to splice large diameter optical waveguide sections. For example, while conventional laser fusion techniques utilizing a single laser beam may provide insufficient heating uniformity for the larger splice region of such large diameter optical waveguides, embodiments of the present invention may utilize multiple laser beams (from one or more laser) to uniformly heat the larger splice region, even if the waveguide sections to be spliced have different cross-sectional dimensions.

As used herein, the term large diameter waveguide generally refers to any type waveguide having a larger diameter (or other cross-sectional dimension if not round) than a conventional optical fiber, which typically has a diameter less than 400 um. For example, one type of large diameter waveguide that may be spliced is a sensor element having one or more gratings formed therein, such as those described in U.S. patent application Ser. No. 09/455,868 entitled "Large Diameter Optical Waveguide, Grating, and Laser," filed Dec. 6, 1999, now U.S. Pat. No. 6,982,996, and hereby incorporated by reference. Such sensor elements are rigid structures unlike optical fibers and have a core similar in size to that of a conventional optical fiber but may have a cladding with an outer diameter of 3 mm or more surrounding the core. Such large diameter optical waveguide sensor elements may be formed by using fiber drawing techniques now know or later developed that provide the resultant desired dimensions for the core and the outer dimensions.

Alternatively, large diameter optical waveguides may be formed by heating, collapsing and fusing a glass capillary tube to a fiber by a laser, filament, flame, etc., as is described in U.S. Pat. No. 6,519,388 entitled "Tube-Encased Fiber Grating", which is incorporated herein by reference. Alternatively, other techniques may be used to fuse a fiber to a tube, such as using a high temperature glass solder, e.g., a silica solder (powder or solid), such that the fiber, the tube and the solder all become fused to each other, or using laser welding/fusing or other fusing techniques.

Figure 1:
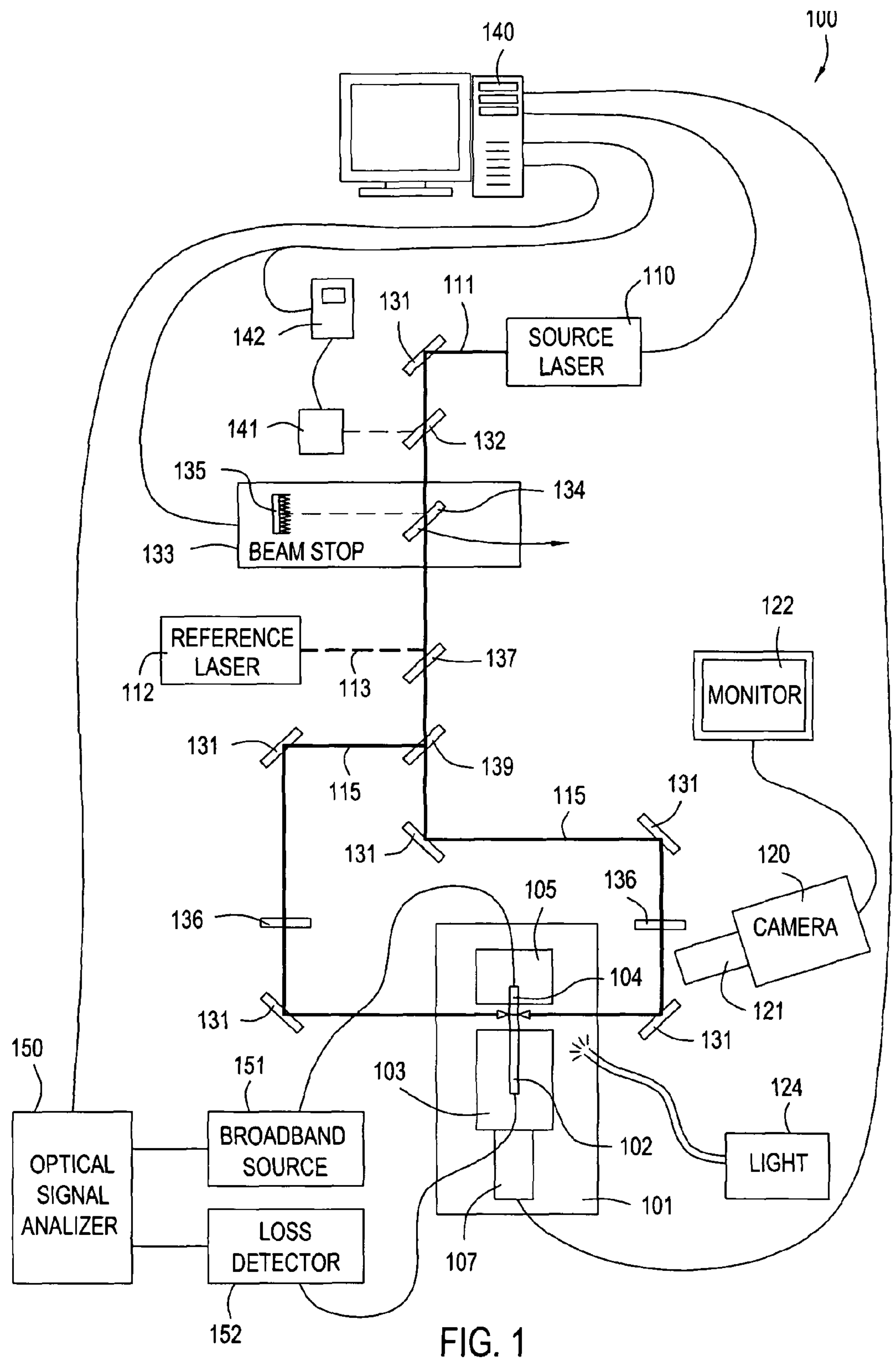
FIG. 1 illustrates an exemplary system for splicing optical waveguide sections in accordance with one embodiment of the present invention.

FIG. 1 illustrates an exemplary system 100 for splicing optical waveguide sections 102 and 104 in accordance with one embodiment of the present invention. As previously described, one or both of the optical waveguide sections may have a larger diameter than conventional optical fibers. For example, for some embodiments, one of the optical waveguide sections may be a large diameter sensor element, while the other optical waveguide section may be a large diameter carrier element used to attach to the large diameter sensor element. For one embodiment, one of the optical waveguide sections may be a large diameter pigtail as described in the commonly assigned co-pending application entitled "Low-Loss Large-Diameter Pigtail" filed herewith Ser. No. 10/755,722.

In the illustrated embodiment, the system 100 includes a holding assembly 101 with stages (or fixtures) 103 and 105 for holding the waveguide sections 102 and 104, respectively, within the path of one or more beams 115 from a source laser 110 during a splice process. One or both of the stages 103-105 may be movable in multiple directions (e.g., along X, Y, and Z axes) to control relative position between and allow alignment of the sections 102-104 prior to and during splicing operations, as will be described in further detail below. For some embodiments, the stage 103 may be mounted on a motor controlled lathe 107 allowing rotation of the waveguide section 102. For such embodiments, the stage 103 may include a tail stock (not shown) with a bore through which excess fiber attached to the waveguide section 102 may be routed. The lathe 107 may also include a port in the headstock through which vacuum (or a pressure gas such as nitrogen) may be applied to the waveguide section 102.

The one or more beams 115 may be generated by splitting a single beam 111 from the source laser 110, via one or more beam splitters 139. Directing multiple beams 115 to different locations about a splice region may provide more uniform heating than a single beam. As illustrated, the split beams 115 may be focused and directed to different locations (e.g., separated by approx. 180° for two beams 115) about the splice region of the waveguide sections 102 and 104 by an arrangement of lenses 136 and mirrors 131. The exact size, type, and configuration of the lenses 136 and mirrors 131 will determine the actual size of the beams 115 and may be chosen according to the size and type of the waveguide sections 102-104 to be spliced. For other embodiments, rather generating multiple beams by splitting a beam from a single source, beams from multiple laser sources may be directed to the splice region.

In any case, the system 100 may also include a reference laser 112 (e.g., a HeNe laser) that provides a beam 113 of visible light for use as a reference, for example, to assist in preliminary alignment of the waveguide sections 102 and 104 (e.g., prior to turning on the laser 110). For example, a camera 120 with a magnifying lens 121 may be used to provide (to an operator) an image of the waveguide sections 102-104 relative to a visible beam 113 on a monitor 122. As illustrated, the reference beam 113 may be provided by a combiner 137, split and travel the same path as the source beam 111.

Various components of the system 100 may be controlled by a controller 140 which may be implemented, for example, as a general purpose computer system equipped with I/O interface cards and running appropriate control software (e.g., National Instrument's LabView). For example, the controller 140 may be configured to control relative movement between the waveguide sections 102-104 before and during splicing operations (e.g., by controlling one or both of the stages 103-105) via one or more stepper motors (not shown). For some embodiments, the controller 140 may be configured with an operator interface, for example, allowing an operator to manually set laser power levels, control relative position of waveguide sections 102-104, initiate automatic operations, and the like.

As will be described in greater detail below, for some embodiments, the controller 140 may align the waveguide sections 102-104 while monitoring the loss of optical power therethrough via an optical signal analyzer 150. For example, during alignment operations, the optical signal analyzer 150 may calculate the loss through the (unspliced) sections 102-104 based on the power of a light signal from a broadband source 151 transmitted through the waveguide section 102, received by the waveguide section 104, and detected by a detector 152. To optimize alignment, the controller 140 (or an operator thereof) may iteratively move the waveguide sections 102-104 to minimize such loss. After splicing operations, the optical signal analyzer 150 may be used to measure the optical power loss through the completed splice.

The controller 140 may also be configured to adjust power of the laser 110 during splicing operations (automatically or based on operator input), as well as during pre/post-splicing operations, such as polishing and annealing. For some embodiments, the controller 140 may monitor the actual output power of the laser 110 via a detector 141 and a laser power meter 142, thus providing a feedback loop and allowing for precise laser power adjustments. As illustrated, the detector 141 may detect a small portion of the laser beam 111, such as the weak side of an unbalanced beam splitter 132 (e.g., the 10% side of a 90/10 beam splitter). The controller 140 may also be configured to control exposure of the waveguide sections 102-104 to the beams 115 via a beam stop assembly 133, illustratively including a shutter 134 and shutter control 135. For some embodiments, the controller 140 may be configured to control splice operations by exposing the waveguide sections 102-104 at each power level for corresponding predetermined amounts of time, with the exact times and power levels determined, for example, based on the exact dimensions and materials of the optical waveguide sections 102-104.

Figure 2:
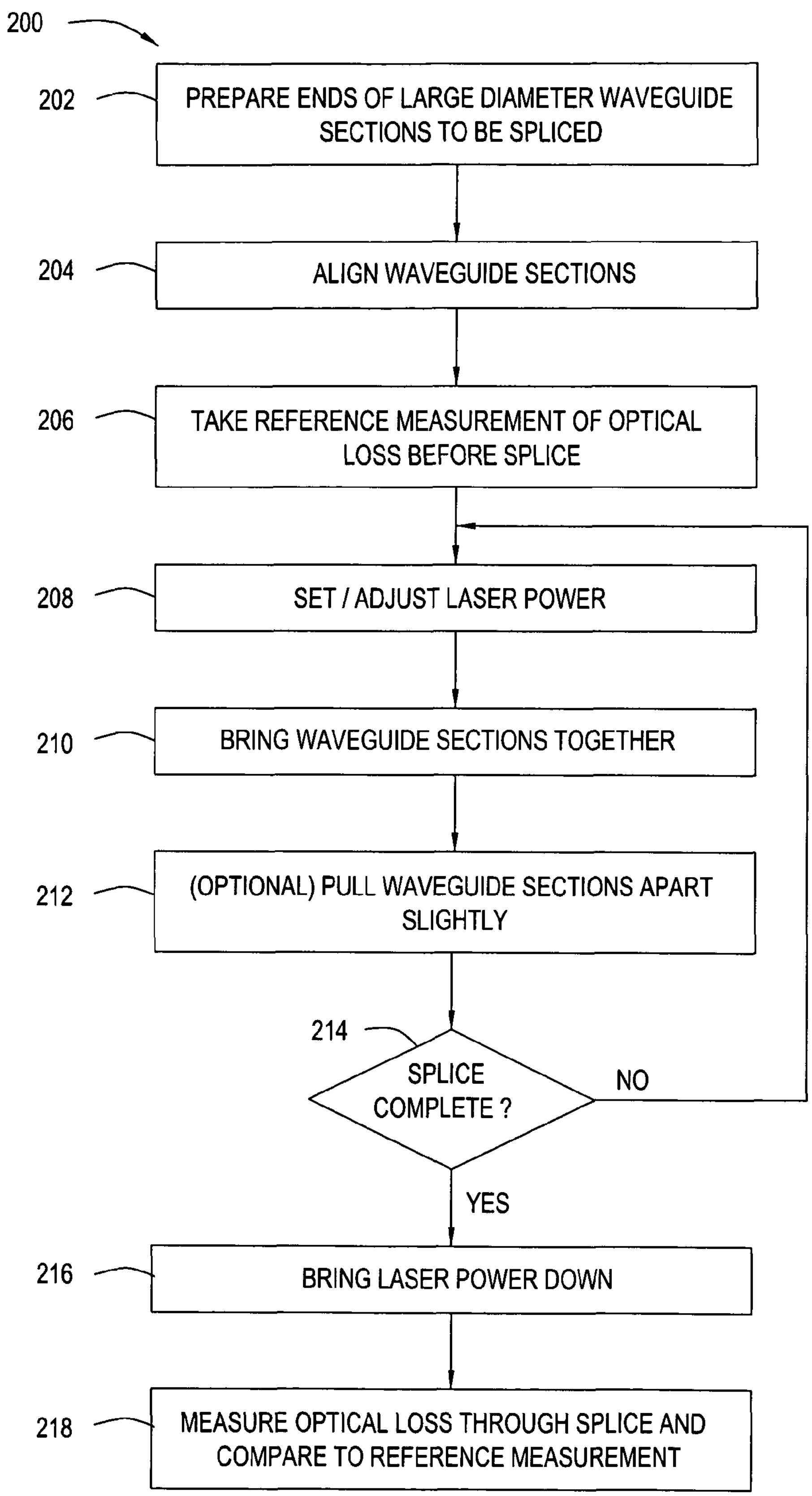
FIG. 2 is a flow diagram of exemplary operations for splicing optical waveguide sections in accordance with one embodiment of the present invention.

FIG. 2 is a flow diagram of exemplary operations 200 for splicing optical waveguide sections in accordance with one embodiment of the present invention. The operations 200 may be performed by components of the system 100. Thus, the operations 200 may be described with reference to FIG. 1, as well as FIGS. 3-6 which illustrate waveguide sections 102-104 at various stages of splice processing, according to various embodiments.

Figure 3:
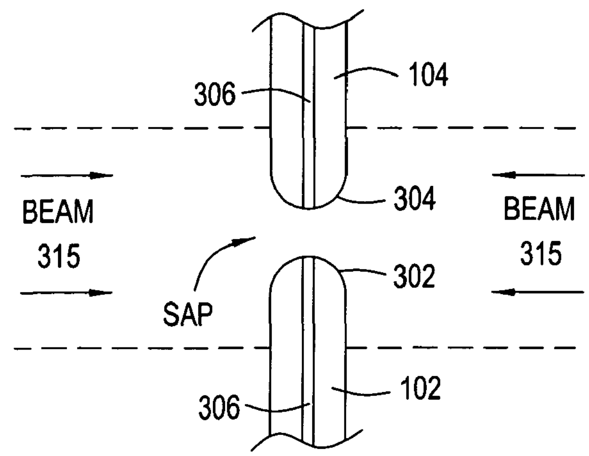
FIG. 3 is a relational view of optical waveguide sections to be spliced in accordance with one embodiment of the present invention.

The operations 200 begin, at step 202, by preparing ends of large diameter optical waveguide sections to be spliced. The optical waveguide sections to be spliced, whether they are large diameter collapsed pigtails, such as those described in co-pending commonly owned U.S. Patent Application No. 60/439,106, cane type waveguide structures, or other type waveguide structures, may be first cut and polished on ends to be fused. As illustrated in FIG. 3, each section 102-104 may be cut flat across a cross-section and ends 302-304 may be polished to achieve a slight curvature. The curvature of the ends 302-304 may allow cores 306 of the waveguide sections 102-104 to be aligned and prevent the possibility of trapping air therebetween during fusion. If the curvature is not present, the ends 302-304 must be more closely matched with a flat polish, which may complicate alignment. In any case, polished ends 302-304 may be cleaned, for example, with an acetone wipe, followed by a methanol wipe and may further be blown with clean air before fusing.

At step 204, the waveguide sections are aligned and, at step 206, one or more reference measurements of optical loss through the waveguide sections before splicing are taken. For example, the sections 102-104 may be mounted in their corresponding stages 103-105, configured to allow X, Y, Z, and angular alignment. For some embodiments, the stages 103-105 may be angularly aligned to each other in an effort to reduce or eliminate the amount of angular adjustment required. As illustrated in FIG. 3, for some embodiments, ends 302-304 of the waveguide sections 102-104 may be heat cleaned (or "fire-polished") by bringing them into the beams 115, for example, with the laser 110 set at a lower power level than that used for fusion. After such polishing, the laser is turned off and the parts are allowed to cool before alignment.

In some cases, reference measurements may be taken through each waveguide section 102-104 individually, and used to estimate loss through the sections 102-104 together. As previously described, for some embodiments, optical loss measurements through the waveguide sections 102-104 to be spliced may be taken during alignment operations. For example, these measurements may be compared against the reference measurements or estimated loss to determine when the sections 102-104 are adequately aligned.

Figure 4:
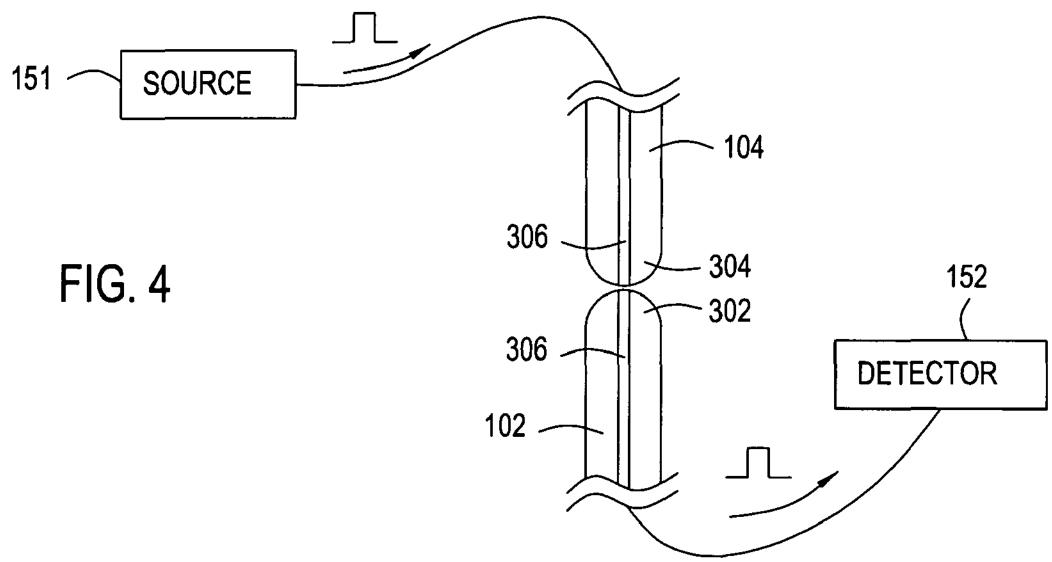
FIG. 4 is a relational view that illustrates one technique for aligning optical waveguide sections to be spliced in accordance with one embodiment of the present invention.
Figure 5:
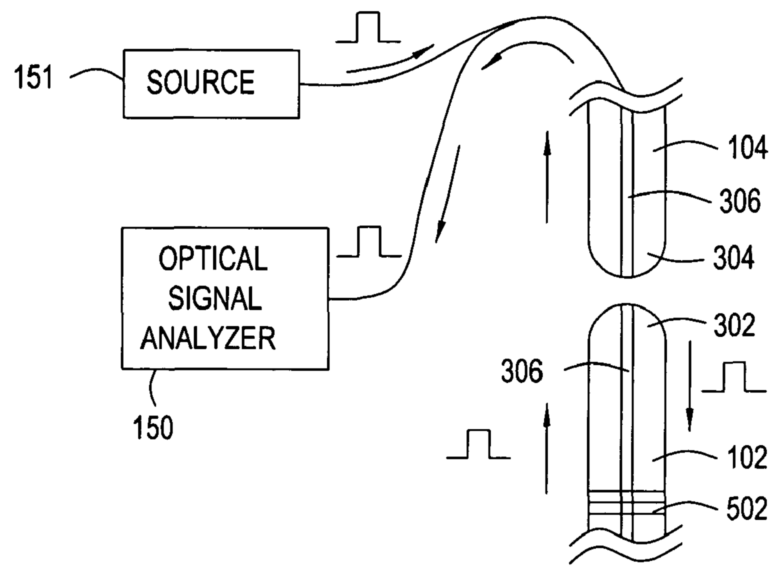
FIG. 5 is a relational view that illustrates another technique for aligning optical waveguide sections to be spliced in accordance with one embodiment of the present invention.

As illustrated in FIG. 4, in some cases, optical loss measurements may be taken by connecting one waveguide section to be fused (e.g., section 104) to a source 151 and connecting the other waveguide section (e.g., section 102) to a detector 152. The optical power loss through the sections 102-104 may be minimized (throughput power maximized) to ensure the best alignment. As illustrated in FIG. 5, an alternative alignment method utilizes one or more gratings 502 written into a fiber connected to one of the waveguide sections (e.g., section 102) to be spliced. In this case, the section to be spliced without the grating 502 (e.g., section 104) is connected to a source 151 and optical signal analyzer 150, and the grating reflectivity is monitored. Maximizing the grating reflectivity indicated by measurements from the analyzer 150 ensures optimal alignment of the waveguide sections 102-104 (due to the round-trip path, the difference between the expected and measured reflectivity corresponds to twice the loss across the waveguide sections 102-104). Either of these methods can also be used to provide an estimate of the splice loss (by comparing the throughput optical power or grating reflectivity) before the splice (e.g., with butt-coupled sections 102-104) with that measured after the splice is complete.

Figure 6A:
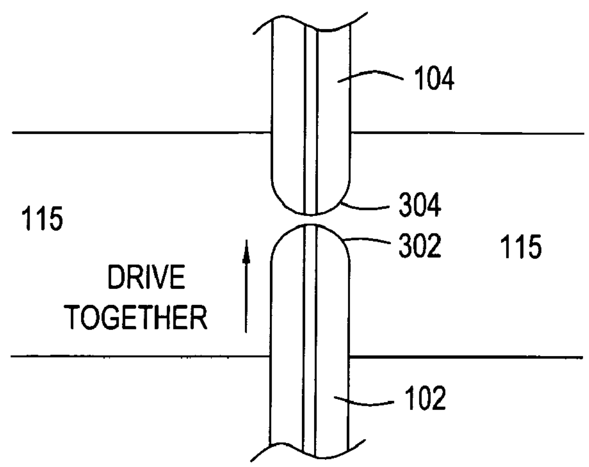
FIGS. 6A-6C illustrate optical waveguide sections at different stages of splicing process in accordance with one embodiment of the present invention.
Figure 6B:
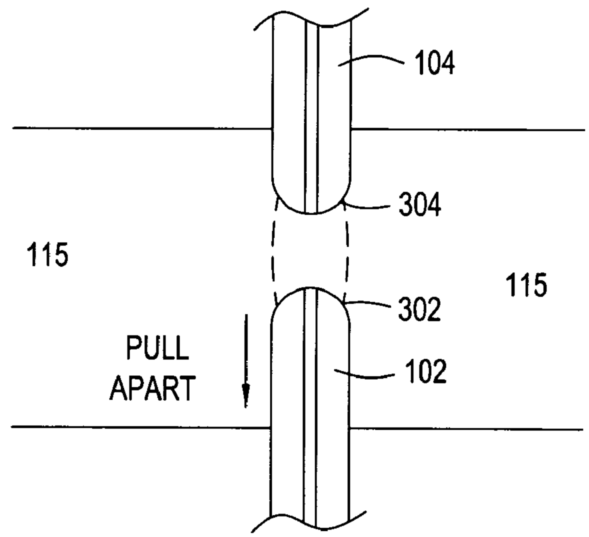

Once aligned, the waveguide sections 102-104 are fused together by controlled exposure to the beams 115 generated from the one or more source lasers 110. At step 208, the laser power is adjusted (or initially set). At step 210, the waveguide sections are brought together (e.g., until they are butt-coupled, as illustrated in FIG. 6A). At step 212, in an (optional) effort to reduce or eliminate bulging at the splice region, as waveguide material around the splice region begins to melt and flow around the ends 302-304, the waveguide sections 102-104 are pulled apart slightly (as illustrated in FIG. 6B). The change in relative distance between the waveguide sections 102-104 during this pushing and pulling may vary with the diameter of the waveguide sections 102-104 and the relative distance may be changed at a relatively low rate (e.g., approx. 50 um/sec).

Figure 6C:
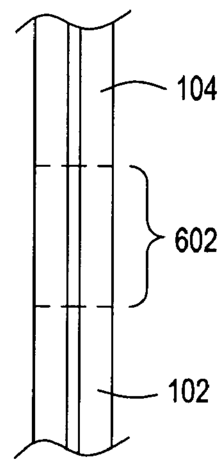

As illustrated, the operations 208-212 may be repeated until the splice is complete (as determined at step 214). For some embodiments, the laser power may be increased incrementally (e.g., by 1-5% each pass), and the waveguide sections 102-104 may be exposed for a given time (e.g., a given number N seconds each pass). FIG. 6C illustrates a completed splice having a fused regions 602. Completion of the splice may be indicated when a heat zone (e.g. monitored via a camera) is visible throughout the entire fused region 602.

At step 216, once the splice is complete, the laser power is brought down (reduced). For some embodiments, the laser power may be brought down slowly to allow for annealing of the splice region 602. In any case, after the parts have cooled, at step 218, the optical loss through the (completed) splice is measured (e.g., by measuring throughput power and/or grating reflectivity) and compared to the (pre-splice) reference measurement taken at step 206 to obtain an estimate of the loss across the splice. Recall if grating reflectivity is measured, the difference between the two readings represents twice the splice loss since the light path has to go through the splice area twice. While these loss measurements may provide reasonable estimates, more reliable cutback measurements may also be made to obtain more accurate splice loss measurements.

The techniques described herein provide methods and techniques that are suitable for laser fusion splicing large diameter (e.g., >1 mm) optical waveguides with low loss across the spliced regions. The uniform heating of splice regions attainable through the use of multiple beams may allow for a stronger splice joint without the use of epoxy, thus reducing or eliminating the temperature and humidity constraints associated with epoxy. Further, eliminating epoxy from the optical path may reduce splice loss. For some embodiments, utilizing the techniques described herein, the loss across a large diameter splice may be less than 0.25 dB.

While the foregoing is directed to embodiments of the present invention, other and further embodiments of the invention may be devised without departing from the basic scope thereof, and the scope thereof is determined by the claims that follow.

The invention claimed is:

1. A system for fusing first and second optical waveguide sections together, each optical waveguide section having a core surrounded by a cladding, comprising:

at least one source laser to provide at least one laser beam;

first and second stages to hold the first and second optical waveguides, respectively, wherein at least one of the first and second stages is movable to provide relative motion between the first and second optical waveguides while holding portions of the first and second optical waveguides to be fused within a fusion splice region while aligning their respective cores; and a beam delivery arrangement to deliver at least two laser beams to different locations of the fusion splice region, wherein the at least two laser beams are generated from the at least one laser beam provided by the at least one source;

wherein at least one of the stages is capable of holding an optical waveguide having a cross-sectional dimension greater than 400 um.

2. The system of claim 1, wherein the first and second stages are capable of holding first and second optical waveguides having different cross-sectional dimensions.

3. The system of claim 1, wherein the at least one source laser comprises at least two source lasers.

4. The system of claim 1, wherein the beam delivery arrangement comprises at least one beam splitter to generate the at least two laser beams from a single laser beam provided by the source laser.

5. The system of claim 1, wherein at least one of the first and second stages is coupled with a lathe capable of providing rotational motion thereto.

6. The system of claim 1, further comprising:

a light source for transmitting light through the first optical waveguide section to the second optical waveguide section;

a detector coupled with the second optical waveguide section; and optical signal processing for measuring a difference in the light transmitted through the first optical waveguide section and the light detected by the detector.

7. The system of claim 1, further comprising:

a light source for transmitting light through the first optical waveguide section to the second optical waveguide section;

one or more reflective gratings formed in an optical waveguide coupled with the second optical waveguide section; and optical signal processing for measuring light transmitted from the light source and reflected from the one or more reflective gratings.

8. The system of claim 1, further comprising a reference laser to provide a visible reference laser beam for use in aligning the first and second optical waveguide sections in the fusion splice region.

9. The system of claim 8, wherein at least a portion of the beam delivery arrangement splits the visible reference laser beam into at least two visible reference laser beams delivered to different locations of the fusion splice region.

* * * * *